(12) United States Patent
Chen

(10) Patent No.: US 10,419,409 B2
(45) Date of Patent: Sep. 17, 2019

(54) METHOD AND APPARATUS FOR SECURE NETWORK COMMUNICATIONS

(71) Applicant: ALIBABA GROUP HOLDING LIMITED, George Town, Grand Cayman (KY)

(72) Inventor: Xiaojiang Chen, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 112 days.

(21) Appl. No.: 15/499,860

(22) Filed: Apr. 27, 2017

(65) Prior Publication Data

US 2017/0237718 A1 Aug. 17, 2017

Related U.S. Application Data

(63) Continuation of application No. PCT/CN2015/092506, filed on Oct. 22, 2015.

(30) Foreign Application Priority Data

Oct. 27, 2014 (CN) .......................... 2014 1 0584748

(51) Int. Cl.
*H04L 9/08* (2006.01)
*H04L 29/06* (2006.01)
*H04L 9/30* (2006.01)

(52) U.S. Cl.
CPC ........ *H04L 63/0442* (2013.01); *H04L 9/0838* (2013.01); *H04L 9/0869* (2013.01);
(Continued)

(58) Field of Classification Search
CPC . H04L 63/0442; H04L 9/0838; H04L 9/0869; H04L 9/30; H04L 63/061
See application file for complete search history.

(56) References Cited

U.S. PATENT DOCUMENTS 8,607,315 B2   10/2013  Jou et al.
8,656,163 B2 *  2/2014  Villegas ................ H04L 9/0838
                                                           380/260
(Continued)

FOREIGN PATENT DOCUMENTS

CN           1859772 A     11/2006
CN         101001144 A      7/2007
(Continued)

OTHER PUBLICATIONS

John Clark (Attacking Authentication Protocols, Mar. 31, 1996, 20 pages) (Year: 1996).*
(Continued)

*Primary Examiner* — Oleg Korsak
(74) *Attorney, Agent, or Firm* — Finnegan, Henderson, Farabow, Garrett & Dunner, LLP

(57) ABSTRACT

Methods and apparatuses are disclosed for secure network communications. An exemplary method may include sending a handshake request message to a server. The handshake request message contains a first random number encrypted by using a first public key and first service request data encrypted by using the first public key. The method may also include receiving a handshake response message replied from the server. The handshake response message contains the first service response data encrypted by using the first random number and a second random number encrypted by using the first random number. The method may further include decrypting the handshake response message by using the first random number to obtain the first service response data and the second random number. In addition, the method may include calculating a session key used in a session with the server in accordance with the first random number and the second random number.

20 Claims, 9 Drawing Sheets

(52) U.S. Cl.
CPC .............. *H04L 9/30* (2013.01); *H04L 63/061* (2013.01); *H04L 2463/062* (2013.01)

(56) References Cited

U.S. PATENT DOCUMENTS

| | | | |
|---|---|---|---|
| 2003/0026428 | A1 | 2/2003 | Loisel |
| 2003/0079143 | A1 | 4/2003 | Mikel et al. |
| 2008/0292105 | A1 | 11/2008 | Wan et al. |
| 2008/0294891 | A1 | 11/2008 | Ram Ov et al. |
| 2013/0297939 | A1 | 11/2013 | Sundaram |

FOREIGN PATENT DOCUMENTS

| | | |
|---|---|---|
| CN | 101052033 A | 10/2007 |
| CN | 100358282 | 12/2007 |
| CN | 101754050 A | 6/2010 |
| CN | 102082790 A | 6/2011 |
| EP | 0537971 A2 | 4/1993 |
| EP | 0537971 A3 | 1/1994 |
| JP | H11331148 A | 11/1999 |
| JP | 2002344438 A | 11/2002 |
| JP | 2005138418 A | 6/2005 |
| JP | 2006276093 A | 10/2006 |
| JP | 2007124055 A | 5/2007 |
| JP | 2009141588 A | 6/2009 |
| JP | 2012221111 A | 11/2012 |
| JP | 2012235214 A | 11/2012 |

OTHER PUBLICATIONS

PCT International Search Report dated Jan. 19, 2016, issued in corresponding International Application No. PCT/CN2015/092506 (9 pages).

European Search Report for European Patent Application No. 15854125.0 dated Jul. 6, 2017.

SIPO First Chinese Search issued in corresponding Chinese Application No. 201410584748.0 dated Apr. 8, 2018, 1 page.

Japanese Patent Office, Notice of Reasons for Refusal issued in corresponding Japanese Patent Application No. 2017-521578, dated Jul. 18, 2019, 7 pages.

\* cited by examiner

```
0      5   8                                                              32
+----------------------------------------------------------------------------+
| version | type |           length                                         |
+----------------------------------------------------------------------------+
|           validity period of the session key                               |
+----------------------------------------------------------------------------+
|                     session ID                                             |
+----------------------------------------------------------------------------+
|                     ciphertext                                             |
+----------------------------------------------------------------------------+
```

FIG. 4

```
0       5       8                                                               32
+--------------------------------------------------------------------------------+
| version | type |         length                                               |
+--------------------------------------------------------------------------------+
|              session ID (32 bits)                                              |
+--------------------------------------------------------------------------------+
|              ciphertext                                                        |
+--------------------------------------------------------------------------------+
```

FIG. 5

METHOD AND APPARATUS FOR SECURE NETWORK COMMUNICATIONS

CROSS REFERENCE TO RELATED APPLICATION

The disclosure claims the benefits of priority to International Application No. PCT/CN2015/092506, filed on Oct. 22, 2015, which claims priority to and the benefits of priority to Chinese Application No. CN 201410584748.0, filed Oct. 27, 2014, both of which are incorporated herein by reference in their entireties.

TECHNICAL FIELD

The present application relates to communication technologies, and more particularly, to secure network communication methods and apparatuses.

BACKGROUND

With rapid development of the Internet, information security is a challenging problem. The hypertext transfer protocol secure (HTTPS) has been adopted for resolving this problem on conventional personal computers (PCs). When the HTTPS is used, a communication process between a client and a server includes a handshake stage, in which the client negotiates with the server for a security key. The server needs to provide the client with a certificate issued by an authority to certify that responses received by the client are from a legal server. It requires many interactions between the client and the server, large packet sizes in each interaction, and huge network traffic. The client requires a lot of computation by using a central processing unit (CPU) to verify the certificate. The required power consumption of the computation is a challenge for a mobile terminal.

SUMMARY

The present disclosure is directed to a method and apparatus for secure network communications. It reduces the number of information interactions for service requests and responses during negotiations on a security key between a client and a server.

In one aspect, the present disclosure is directed to a method for secure network communications. The method may include sending a handshake request message to a server. The handshake request message contains a first random number encrypted by using a first public key and first service request data encrypted by using the first public key. The server decrypts the handshake request message in accordance with a first private key corresponding to the first public key to obtain the first random number and the first service request data, and generates first service response data in accordance with the first service request data. The method may also include receiving a handshake response message replied from the server. The handshake response message contains the first service response data encrypted by using the first random number and a second random number encrypted by using the first random number. The method may further include decrypting the handshake response message by using the first random number to obtain the first service response data and the second random number. In addition, the method may include calculating a session key used in a session with the server in accordance with the first random number and the second random number.

In some embodiments, the method may include sending a ciphertext service request message to the server. The ciphertext service request message contains an identifier of the session key and second service request data encrypted by using the session key. The server looks up a corresponding session key in accordance with the identifier of the session key, and decrypts the ciphertext service request message by using the corresponding session key to obtain the second service request data. The method may also include receiving a ciphertext service response message replied from the server. The ciphertext service response message contains second service response data encrypted by using the corresponding session key. The second service response data is generated by the server in accordance with the second service request data.

In some embodiments, the method may include sending a plaintext service request message to the server. The plaintext service request message contains third service request data for a plaintext. The server obtains the third service request data for the plaintext from the plaintext service request message. The method may also include receiving a plaintext service response message replied from the server. The plaintext service response message contains third service response data of the plaintext. The third service response data is generated by the server in accordance with the third service request data.

In some embodiments, the method may include receiving a notification of expiration of the session key replied from the server. The method may also include sending another handshake request message to the server.

In another aspect, the present disclosure is directed to a method for secure network communications. The method may include receiving a handshake request message sent from a client. The handshake request message contains a first random number encrypted by using a first public key and first service request data encrypted by using the first public key. The method may also include decrypting the handshake request message by using a first private key corresponding to the first public key to obtain the first random number and the first service request data. The method may further include generating first service response data in accordance with the first service request data. In addition, the method may include sending a handshake response message to the client. The handshake response message contains the first service response data encrypted by using the first random number and a second random number encrypted by using the first random number. The client decrypts the handshake response message by using the first random number to obtain the first service response data and the second random number, and calculates a session key used in a session in accordance with the first random number and the second random number based on a first key algorithm. Moreover, the method may include calculating the session key used in the session in accordance with the first random number and the second random number based on the first key algorithm.

In some embodiments, the method may further include receiving a ciphertext service request message sent from the client. The ciphertext service request message contains an identifier of the session key and second service request data encrypted by using the session key. The method may also include looking up a corresponding session key in accordance with the identifier of the session key. The method may further include decrypting the ciphertext service request message by using the corresponding session key to obtain the second service request data. In addition, the method may include generating second service response data in accordance with the second service request data. Moreover, the method may include sending a ciphertext service response message to the client. The ciphertext service response message contains the second service response data encrypted by using the corresponding session key.

In some embodiments, the method may further include receiving a plaintext service request message sent by the client. The plaintext service request message contains third service request data for a plaintext. The method may also include obtaining the third service request data from the plaintext service request message. The method may further include generating third service response data of the plaintext in accordance with the third service request data. In addition, the method may include sending a plaintext service response message to the client. The plaintext service response message contains the third service response data of the plaintext.

In some embodiments, the method may further include receiving a fourth service request message sent from the client. The method may also include determining whether the fourth service request message is the ciphertext service request message or the plaintext service request message. The method may further include generating a first encryption identifier in accordance with the determination result of whether the fourth service request message is the ciphertext service request message or the plaintext service request message. In addition, the method may include establishing a first mapping relationship between an identifier of the fourth service request message and the first encryption identifier of the fourth service request message. When receiving a fifth service request message sent from the client, the method may include looking up a second encryption identifier in accordance with an identifier of the fifth service request message and the first mapping relationship. The method may include triggering execution of sending the ciphertext service response message to the client if the second encryption identifier indicates that the fifth service request message is the ciphertext service request message. The method may include triggering execution of sending the plaintext service response message to the client if the second encryption identifier indicates that the fifth service request message is the plaintext service request message.

In a further aspect, the present disclosure is directed to an apparatus for secure network communications. The apparatus may include a handshake request sending unit configured to send a handshake request message to a server. The handshake request message contains a first random number encrypted by using a first public key and first service request data encrypted by using the first public key. The server decrypts the handshake request message in accordance with a first private key corresponding to the first public key to obtain the first random number and the first service request data, and generates first service response data in accordance with the first service request data. The apparatus may also include a handshake response receiving unit configured to receive a handshake response message replied from the server. The handshake response message contains the first service response data encrypted by using the first random number and a second random number encrypted by using the first random number. The apparatus may further include a handshake response decrypting unit configured to decrypt the handshake response message by using the first random number to obtain the first service response data and the second random number. In addition, the apparatus may include a session key calculating unit configured to calculate a session key used in a session with the server in accordance with the first random number and the second random number.

In some embodiments, the apparatus may further include a ciphertext service request sending unit configured to send a ciphertext service request message to the server. The ciphertext service request message contains an identifier of the session key and second service request data encrypted by using the session key. The server looks up a corresponding session key in accordance with the identifier of the session key, and decrypts the ciphertext service request message by using the corresponding session key to obtain the second service request data. The apparatus may also include a ciphertext service response receiving unit configured to receive a ciphertext service response message replied from the server. The ciphertext service response message contains second service response data encrypted by using the corresponding session key. The second service response data is generated by the server in accordance with the second service request data.

In some embodiments, the apparatus may further include a plaintext service request sending unit configured to send a plaintext service request message to the server. The plaintext service request message contains third service request data for a plaintext. The server obtains the third service request data for the plaintext from the plaintext service request message. The apparatus may also include a plaintext service response receiving unit configured to receive a plaintext service response message replied from the server. The plaintext service response message contains third service response data of the plaintext. The third service response data is generated by the server in accordance with the third service request data.

In yet another aspect, the present disclosure is directed to an apparatus for secure network communications. The apparatus may include a handshake request receiving unit configured to receive a handshake request message sent by a client. The handshake request message contains a first random number encrypted by using a first public key and first service request data encrypted by using the first public key. The apparatus may also include a handshake request decrypting unit configured to decrypt the handshake request message by using a first private key corresponding to the first public key to obtain the first random number and the first service request data. The apparatus may further include a first service response generating unit configured to generate first service response data in accordance with the first service request data. In addition, the apparatus may include a handshake response sending unit configured to send a handshake response message to the client. The handshake response message contains the first service response data encrypted by using the first random number and a second random number encrypted by using the first random number. The client decrypts the handshake response message by using the first random number to obtain the first service response data and the second random number, and calculates the session key used in the session in accordance with the first random number and the second random number based on a first key algorithm. In addition, the apparatus may include a session key calculating unit configured to calculate a session key used in a session in accordance with the first random number and the second random number based on a first key algorithm.

In some embodiments, the apparatus may further include a ciphertext service request receiving unit configured to receive a ciphertext service request message sent by the client. The ciphertext service request message contains an identifier of the session key and second service request data encrypted by using the session key. The apparatus may also include a session key lookup unit configured to look up a corresponding session key in accordance with the identifier of the session key. The apparatus may further include a service request decrypting unit configured to decrypt the ciphertext service request message by using the corresponding session key to obtain the second service request data. In addition, the apparatus may include a second service response generating unit configured to generate second service response data in accordance with the second service request data. Moreover, the apparatus may include a ciphertext service response sending unit configured to send a ciphertext service response message to the client. The ciphertext service response message contains the second service response data encrypted by using the corresponding session key.

In some embodiments, the apparatus may further include a plaintext service request receiving unit configured to receive a plaintext service request message sent by the client. The plaintext service request message contains third service request data for a plaintext. The apparatus may also include a service request data obtaining unit configured to obtain the third service request data for the plaintext from the plaintext service request message. The apparatus may further include a third service response generating unit configured to generate third service response data of the plaintext in accordance with the third service request data for the plaintext. In addition, the apparatus may include a plaintext service response sending unit configured to send a plaintext service response message to the client. The plaintext service response message contains the third service response data of the plaintext.

From the above technical solutions provided in the embodiments of the present disclosure, service request data is sent simultaneously in the process of negotiating a session key. Service response data can be obtained through a handshake response message in the process of session key negotiation. It may save an additional subsequent step of sending a service request message for this part of service request data, and may also save another additional step of receiving a service response message for corresponding service response data. The number of message interactions with the server is therefore reduced compared with the prior art.

BRIEF DESCRIPTION OF THE DRAWINGS

To describe the technical solutions in the embodiments of the present disclosure, the exemplary drawings are introduced briefly in the following. These drawings include some embodiments of the present disclosure. A person of ordinary skill in the art may further obtain other drawings in accordance with these drawings without inventive effort.

FIG. 4 is a schematic diagram of an exemplary implementation of a handshake response message, according to an embodiment of the present application.

FIG. 5 is a schematic diagram of an exemplary implementation of a ciphertext service request message, according to an embodiment of the present application.

DETAILED DESCRIPTION

To describe the technical solutions of the present application for a person of skill in the art to have a better understanding, some embodiments of the present application are described with the drawings in the following. These embodiments are merely part of the embodiments of the present application, rather than all of the embodiments. Based on these embodiments, all other embodiments derived by a person of ordinary skill in the art without inventive effort shall fall within the scope of the present application.

In current communication technologies, service requests and responses between a client and a server must be proceeded after negotiations for a security key. It requires many message interactions, and therefore it is time-consuming.

Figure 1A:
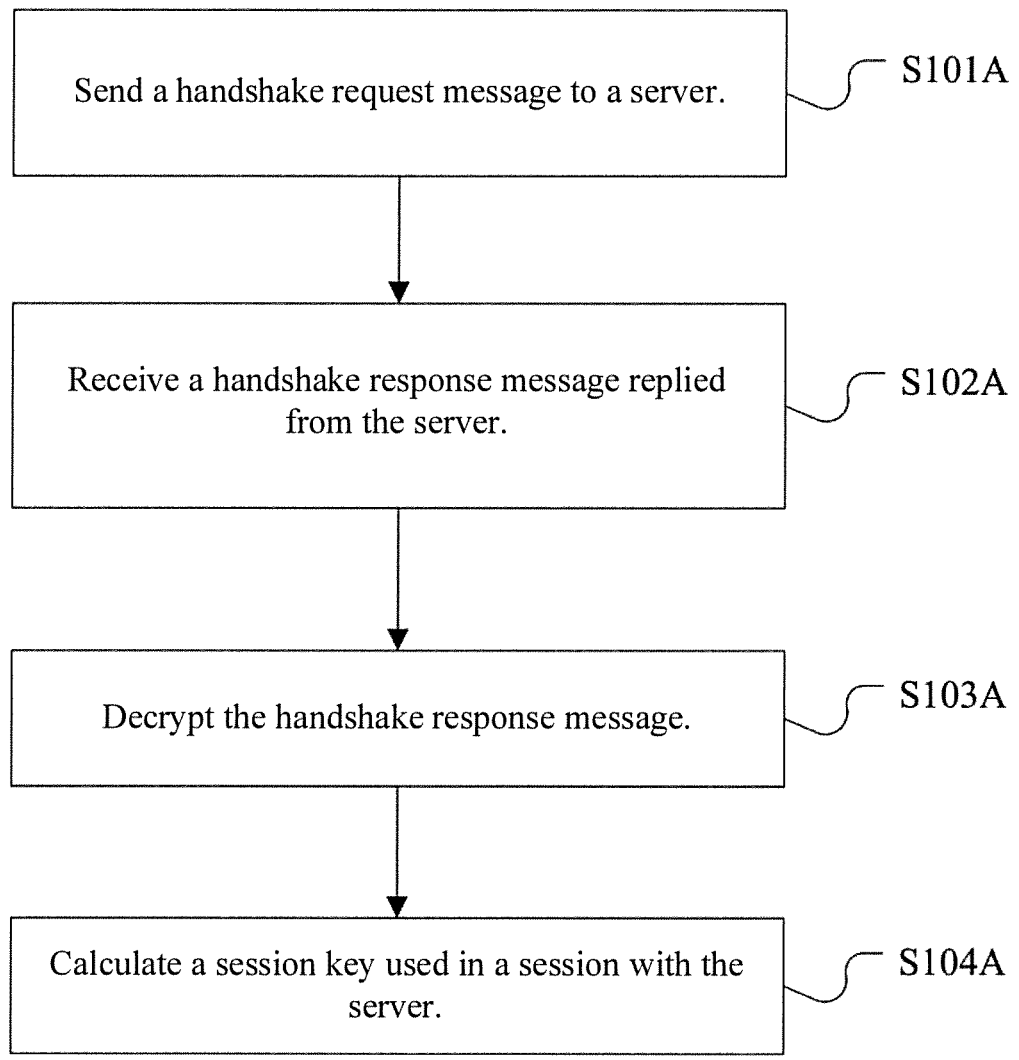
FIG. 1A is a flow chart of an exemplary method for secure network communications, according to an embodiment of the present application.

To solve these problems, the present application proposes a method for secure network communications, as shown in FIG. 1A. The method may include the following steps.

Step S101A: Send a handshake request message to a server. The handshake request message contains a first random number encrypted by using a first public key and first service request data encrypted by using the first public key. The server decrypts the handshake request message in accordance with a first private key corresponding to the first public key to obtain the first random number and the first service request data, and generates first service response data in accordance with the first service request data.

Step S102A: Receive a handshake response message replied from the server. The handshake response message contains the first service response data encrypted by using the first random number and a second random number encrypted by using the first random number.

Step S103A: Decrypt the handshake response message by using the first random number to obtain the first service response data and the second random number.

Step S104A: Calculate a session key used in a session with the server in accordance with the first random number and the second random number.

A client may be an entity executing the above steps S101A-S104A.

In the embodiment as shown in FIG. 1A, the method may include sending service request data simultaneously in the process of negotiating a session key. Service response data may be obtained through a handshake response message in the process of session key negotiation. It may save a step of sending an additional service request message for the service request data. It may also save a step of receiving an additional service response message for the corresponding service response data. Therefore, it may reduce the number of message interactions with the server compared with the prior art.

Figure 1B:
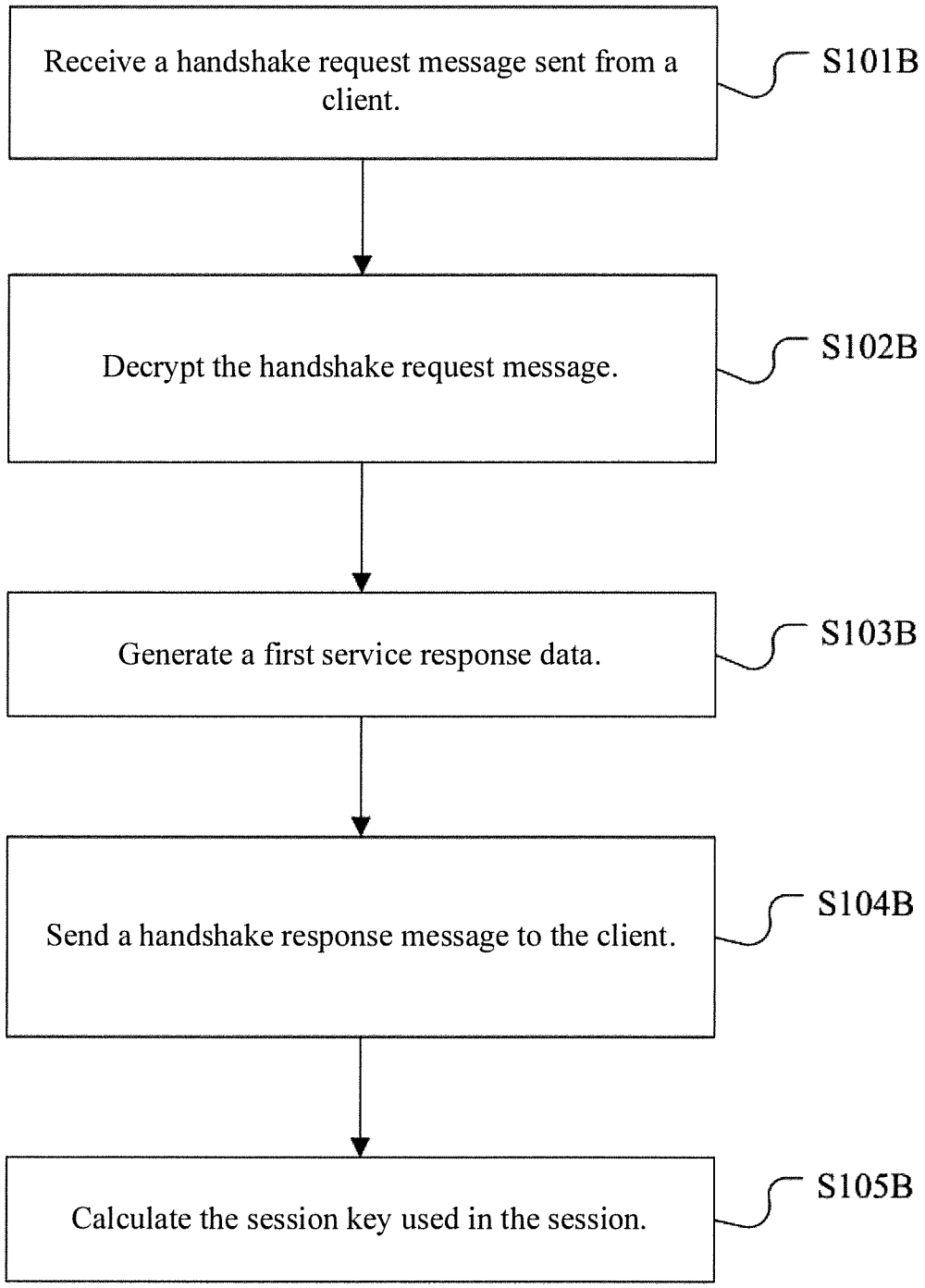
FIG. 1B is a flow chart of an exemplary method for secure network communications, according to an embodiment of the present application.

The present application proposes another method for secure network communications, as shown in FIG. 1B. The method may include the following steps.

Step S101B: Receive a handshake request message sent from a client. The handshake request message contains a first random number encrypted by using a first public key and first service request data encrypted by using the first public key.

Step S102B: Decrypt the handshake request message by using a first private key corresponding to the first public key to obtain the first random number and the first service request data.

Step S103B: Generate first service response data in accordance with the first service request data.

Step S104B: Send a handshake response message to the client. The handshake response message contains the first service response data encrypted by using the first random number and a second random number encrypted by using the first random number. The client decrypts the handshake response message by using the first random number to obtain the first service response data and the second random number, and calculates a session key used in a session in accordance with the first random number and the second random number based on a first key algorithm.

Step S105B: Calculate the session key used in the session in accordance with the first random number and the second random number based on the first key algorithm.

A server may be an entity executing the above steps S101B-S105B.

In the embodiment as shown in FIG. 1B, the method may include receiving service request data simultaneously in the process of negotiating a session key with a client. Service response data may be sent through a handshake response message in the process of session key negotiation. It may save a step of receiving an additional service request message for the service request data. It may also save another step of sending an additional service response message for the corresponding service response data. Therefore, it may reduce the number of message interactions with the client compared with the prior art.

An exemplary process of the embodiment of the present application is illustrated in detail below.

Figure 2:
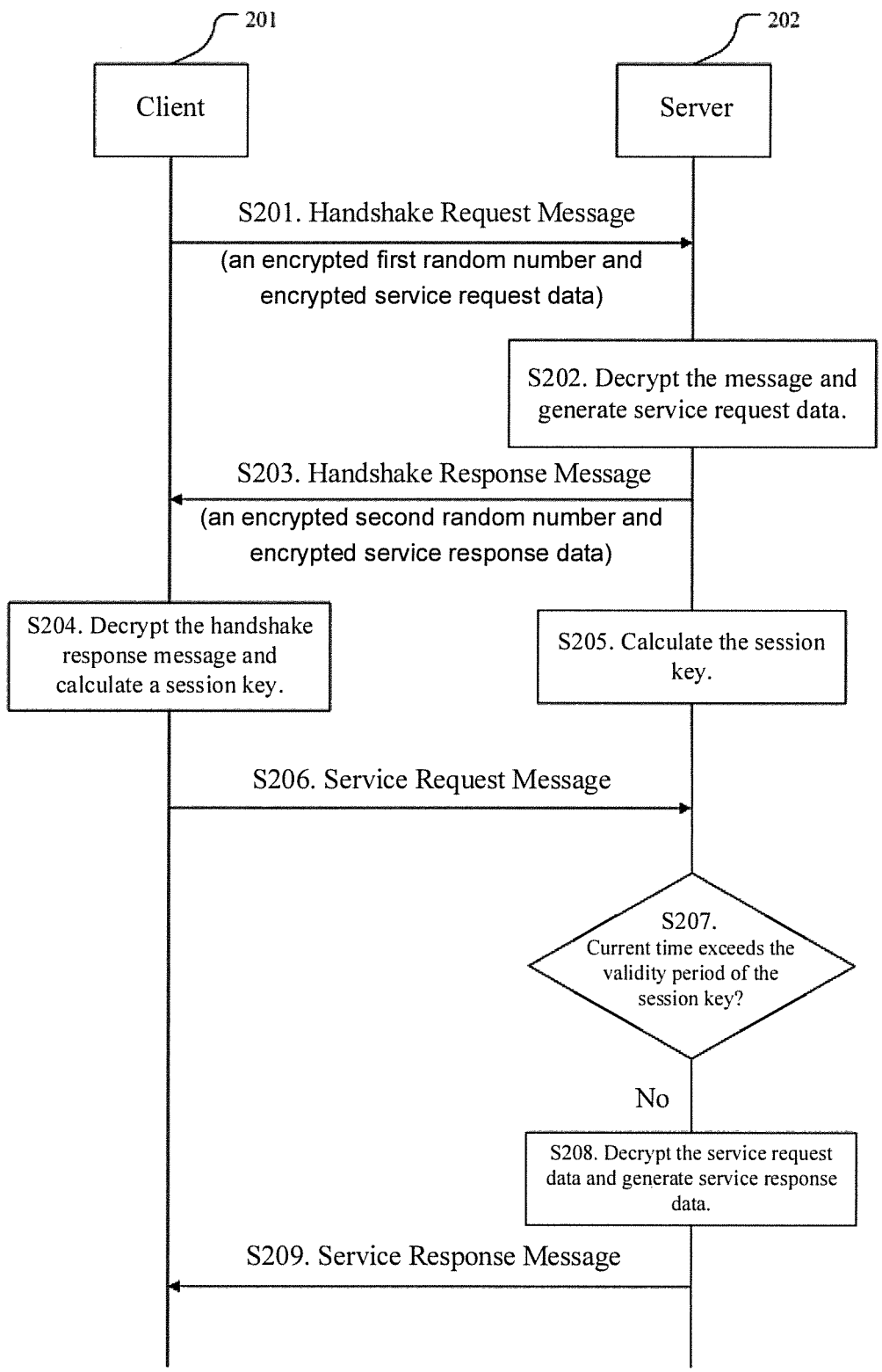
FIG. 2 is a schematic diagram of an exemplary process of an exemplary method for secure network communications, according to an embodiment of the present application.

FIG. 2 is a schematic diagram of an exemplary process of an exemplary method for secure network communications. As shown in FIG. 2, the method may include the following steps.

Step S201: A client 201 sends a handshake request message to a server 202. The handshake request message contains a first random number (which may be marked as nonce1) encrypted by using a public key of a non-symmetric encryption algorithm and service request data encrypted by using the public key.

The public key of the non-symmetric encryption algorithm is a public key broadly distributed by the server 202. A device sending data to the server 202 may encrypt the data by using the public key. The server 202 may decrypt the data by using a private key in the server.

Figure 3:
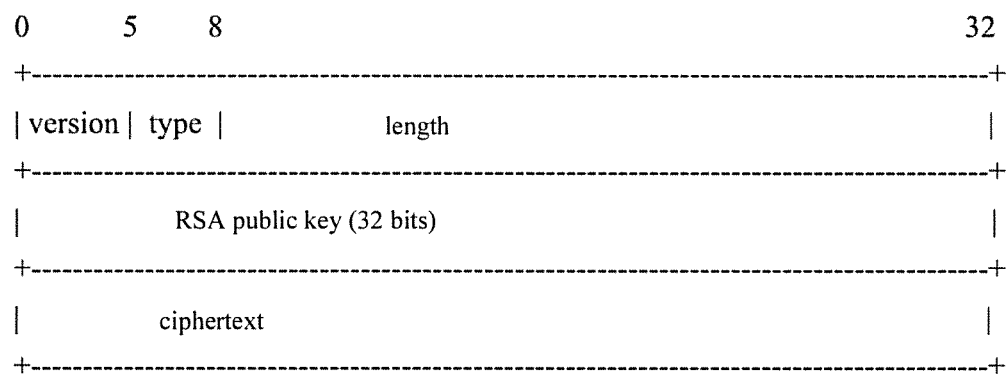
FIG. 3 is a schematic diagram of an exemplary implementation of a handshake request message, according to an embodiment of the present application.

The handshake request message, sent by the client 201 to the server 202, may adopt a message format as shown in FIG. 3. In FIG. 3, the version field may indicate information about a version and a protocol. For example, if a secure channel for secure communications between the client 201 and the server 202 is based on a hypertext transfer protocol (HTTP), the version field may be set to be 11001B (where B stands for that the previous number is a binary number). If the secure channel is based on a SPDY protocol, the version field may be set to 11101B.

In FIG. 3, the type field may indicate information about a message type. The type field of the handshake request message sent by the client 201 may be set to be 0x01. The value indicates that the type of the message is a handshake request. In this way, the server 202, upon receiving the message, may know that the message is a handshake request message.

In FIG. 3, the length field may indicate the length of the message in bytes, excluding the first 4 bytes for the version, type, and length fields.

In FIG. 3, the RSA public key (32 bit) field may indicate a 32-bit Rivest-Shamir-Adleman (RSA) public key. The RSA public key is the public key of the non-symmetric encryption algorithm in step S201.

The first random number may be a random number obtained from calculation in the client 201.

Step S202: The server 202 decrypts the received handshake request message in accordance with a private key of the non-symmetric algorithm to obtain the first random number and the service request data, and generates service response data in accordance with the service request data.

In some embodiments, to ensure security of the communications between the client 201 and the server 202, the server 202 may further verify the handshake request message from the client 201. If the verification is failed, the server 202 may terminate the connection with the client 201, and stop executing the subsequent procedure. If the verification is successful, the server 202 may continue generating the service response data in accordance with the service request data.

Two methods may be used for the above verification of the handshake request message.

Method 1: The first field of the first random number contained in the handshake request message sent by the client 201 to the server 202 is a Magic Code. If a third party tampers with the message in the process of sending from the client 201 to the server 202, the first field of the first random number will be changed. Accordingly, the verification on the handshake request message by the server 202 may be conducted by checking whether the first field of the decrypted first random number is the Magic Code. If yes, the verification is successful. If no, the verification is failed. The Magic Code may also be referred to as a magic number. The technology of magic number may determine legitimacy of a message quickly by means of inserting a certain number of bytes, indicating a constant, at the header or tail of data.

Method 2: The server 202 may impose a requirement on the length of the handshake request message sent by the client 201. If the handshake request message is magnified, when being sent from the client 201 to the server 202, by a malicious user for an attack, the length of the handshake request message may be abnormal. Accordingly, the verification on the handshake request message by the server 202 may also be conducted by checking whether the length of the handshake request message is abnormal or not. If the length is abnormal, the verification is failed. If the length is normal, the verification is successful.

Step S203: The client 202 sends a handshake response message to the server 201. The handshake response message contains a second random number (which may be marked as nonce2) encrypted by using the first random number as the security key and service response data encrypted by using the first random number as the security key.

The second random number may be a random number obtained from calculation in the server 202.

The handshake response message sent by the server 202 to the client 201 may adopt the message format as shown in FIG. 4.

In FIG. 4, the version field may indicate information about a version and a protocol. For example, if a secure channel for secure communications between the client 201 and the server 202 is based on HTTP, the version field may be set to be 11001B. If the secure channel is based on a SPDY protocol, the version field may be set to 11101B.

The type field may indicate information about a message type. The type field of the handshake response message sent by the server 202 may be set to be 0x03. The value indicates that the type of the message is a handshake response. In this way, the client 201, upon receiving the message, may know that the message is a handshake response message.

In FIG. 4, the length field may indicate the length of the message in bytes, excluding the first 4 bytes for the version, type, and length fields.

In FIG. 4, the ciphertext field may include the second random number encrypted by using the first random number as the security key and the service response data encrypted by using the first random number as the security key.

Step S204: The client 201 may decrypt the received handshake response message by using the first random number to obtain the second random number and the service response data, and calculates a session key in accordance with the first random number and the second random number based on a symmetric encryption algorithm.

The session key may be obtained by the following calculation.

session key=sha256(nonce1, nonce2)
where nonce1 is the first random number, and nonce2 is the second random number.

In some embodiments, to ensure security of the communications between the client 201 and the server 202, the client 201 may further verify the handshake response message from the server 202. The first field of the second random number contained in the handshake response message sent by the server 202 to the client 201 is a Magic Code. If a third party tampers with the message in the process of sending from the server 202 to the client 201, the first field of the second random number will be changed. Accordingly, the verification on the handshake response message by the server 202 may be conducted by checking whether the first field of the decrypted second random number is the Magic Code. If no, the verification is failed. If yes, the verification is successful. The client 201 may continue to calculate the session key.

Step S205: The server 202 may calculate the session key through the same algorithm as that in step S204 in accordance with the first random number and the second random number.

Either step S204 or step S205 may be executed before the other or at the same time as long as the algorithms for calculating the session key in step S204 and step S205 are the same. In this way, the server 202 and the client 201 may obtain the same session key. The session key may be used to encrypt data when the client 201 and the server 202 transmit the service request message and the service response message to each other.

The above steps S201-S205 may include the process of handshake stage and the negotiation of the session key.

The client 201 and the server 202 may create a session through the above handshake stage. Transmissions of the subsequent service request message and service response message based on this session may be encrypted by using the common session key obtained during the negotiations at the handshake stage. The server 202 may assign an identifier (ID) for the created session, denoted as a session ID. As shown in FIG. 4, the session ID may be contained in the handshake response message sent from the server 202 to the client 201.

Moreover, the handshake response message in FIG. 4 may further contain a validity period of the session key. When the connection is re-established after a disconnection within the validity period, the session key may be reused without re-negotiation. When the validity period is zero, a key may be used only once. That is, the session key may be only valid in this connection. Once the connection is disconnected, it is necessary to perform steps S201 to S205 again to re-negotiate another session key. The validity period of the session key may be a relative period of time. For example, the session key may be valid within a first time length relative to and after the time at which the server 202 sent the handshake response message to the client 201. A value of the first time length, as a relative time, may be contained in the validity period of session key field in FIG. 4.

It should be noted that, in the solution shown in FIG. 4, the server 202 delivers the validity period of the session key and the session ID together through the handshake response message. In some embodiments, the validity period of the session key and the session ID may be delivered to the client 201 through another message.

After the handshake stage, the client 201 and the server 202 may commence interaction of service data. The interaction process of the service data is described in detail in the following.

Step S206: The client 201 sends a service request message to the server 202. The service request message contains a session ID and service request data encrypted by using the session key.

The message containing ciphertext service request data sent by the client 201 may adopt the format as shown in FIG. 5.

The version field may indicate information about a version and a protocol. If a secure channel for secure communications between the client 201 and the server 202 is based on HTTP, the version field may be set to be 11001B. If the secure channel is based on a SPDY protocol, the version field may be set to 11101B.

The type field may indicate information about a message type. The type field of the ciphertext service request message sent by the client may be set to be 0x02, indicating that the type of the message is a ciphertext service request. In this way, the server 202, upon receiving the message, may know that the message is a service request message, and that service request data in the service request message has been encrypted. In some embodiments, transmissions of service request messages and service response messages between the client 201 and the server 202 in the same session may contain plaintext data or ciphertext data. For obtaining those service data without concern for security, the service request data, contained in the service request message sent by the client 201 to the server 202, may be in a plaintext form. In this way, the server 202 may be notified, through the information on the message type of the service request message, that the service request data contained in the service request message is a plaintext. There is no need to decrypt the service request data. Therefore, the service request message, sent by the client 201 to the server 202, does not need to contain the session ID.

Step S207: The server 202 looks up a corresponding session key and a validity period of the session key in accordance with the session ID in the service request message, and determines whether the current time exceeds the validity period of the session key.

During the negotiation of the session key, the server 202 may have established a correspondence between the session ID and the session key. Accordingly, after the server 202 obtains the session ID in the service request message, a correct session key may be found through the above correspondence.

In some embodiments, a validity period is assigned for the session key. Therefore, after the session key is found, it is necessary to determine whether the current time exceeds the validity period of the session key. In some embodiments, the step of assigning the valid time for the session key may be omitted. In this case, it is unnecessary to determine whether the current time exceeds the validity period of the session key.

When the server 202 determines that the current time has exceeded the validity period of the session key, the server 202 may reply the client 201 a message notifying invalidity of the session key. It may urge the client 201 to restart a negotiation process of another session key with the server 202.

Step S208: After the server 202 determines that the current time does not exceed the validity period of the session key, the server 202 decrypts the service request data in the received service request message by using the session key to obtain decrypted service request data, and generates service response data according to the decrypted service request data.

Step S209: The server 202 sends a service response message to the client 201. The service response message contains service response data encrypted by using the session key found in step S207.

Figure 6:
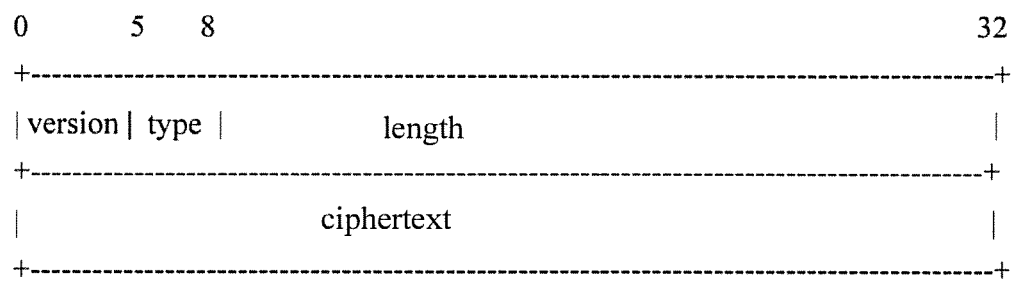
FIG. 6 is a schematic diagram of an exemplary implementation of a service response message, according to an embodiment of the present application.

The server 202 may make the service response message encapsulated by using the message format as shown in FIG. 6.

In FIG. 6, The version field may indicate information about a version and a protocol. If a secure channel for secure communications between the client 201 and the server 202 is based on HTTP, the version field may be set to be 11001B. If the secure channel is based on a SPDY protocol, the version field may be set to be 11101B.

The type field may indicate information about a message type. When the service response data contained in the service response message, sent by the server 202 to the client 201, is encrypted, the type field of the message may be set to be 0x05.

The length field may indicate the length of the message in bytes, excluding the first 4 bytes for the version, type, and length fields.

In some embodiments, the server 202 may process the service response message from the client 201 in a synchronous manner. For the service response message, whether the service response data in the service response message is encrypted may depend on whether the service request data in the received service request message is encrypted. That is, if the service request data in the service request message received by the server 202 is encrypted through the session key, the service response data in the service response message replied by the server 202 to the client 201 is also encrypted through the session key. If the service request data in the service request message received by the server 202 is not encrypted, the service response data in the service response message replied by the server 202 to the client 201 is not encrypted. In some embodiments, the server 202 may learn, by reading the message type information in the service request message, whether the service response data in the service request message is encrypted. For example, when the server 202 found that the type information of the message is set to be 0x05, the server 202 may determine that the service request data in the service request message is encrypted.

In some embodiments, the server 202 may process the service request message from the client 201 in an asynchronous manner. When the server 202 replies the service response message to the client 201, it is hard to directly know whether the service request data in the original service request message is encrypted. Therefore, the server 202 may record an identifier of each service request message sent by the client 201 to the server 202, and record information about whether service request data in each service request message is encrypted (the information is hereinafter referred to as an encryption identifier), thereby maintaining an association between the identifier of each service request message and the encryption identifier of the service request message. When the server 202 needs to reply a service response message for a service request message sent by the client 201, the server 202 may firstly find a corresponding encryption identifier of the service request message through the above association in accordance with the identifier of the service request message. If the encryption identifier indicates that the service request data was encrypted, the server 202 may encrypt the service response data in the service response message. If the encryption identifier indicates that the service request data is not encrypted, the server 202 may not encrypt the service response data in the service response message.

In some embodiments, the association, between the identifier of each service request message and the information indicating whether the service request data of the request message is encrypted, maintained by the server 202 may be implemented by using a mapping relationship. The mapping relationship may include at least one entry. Each entry may store an identifier of a service request message and an encryption identifier of the service request message. For example, when the service request data of the service request message is encrypted, the encryption identifier of the service request message may be set to be "1." When the service request data of the service request message is not encrypted, the encryption identifier of the service request message may be set to be "0."

Figure 7:
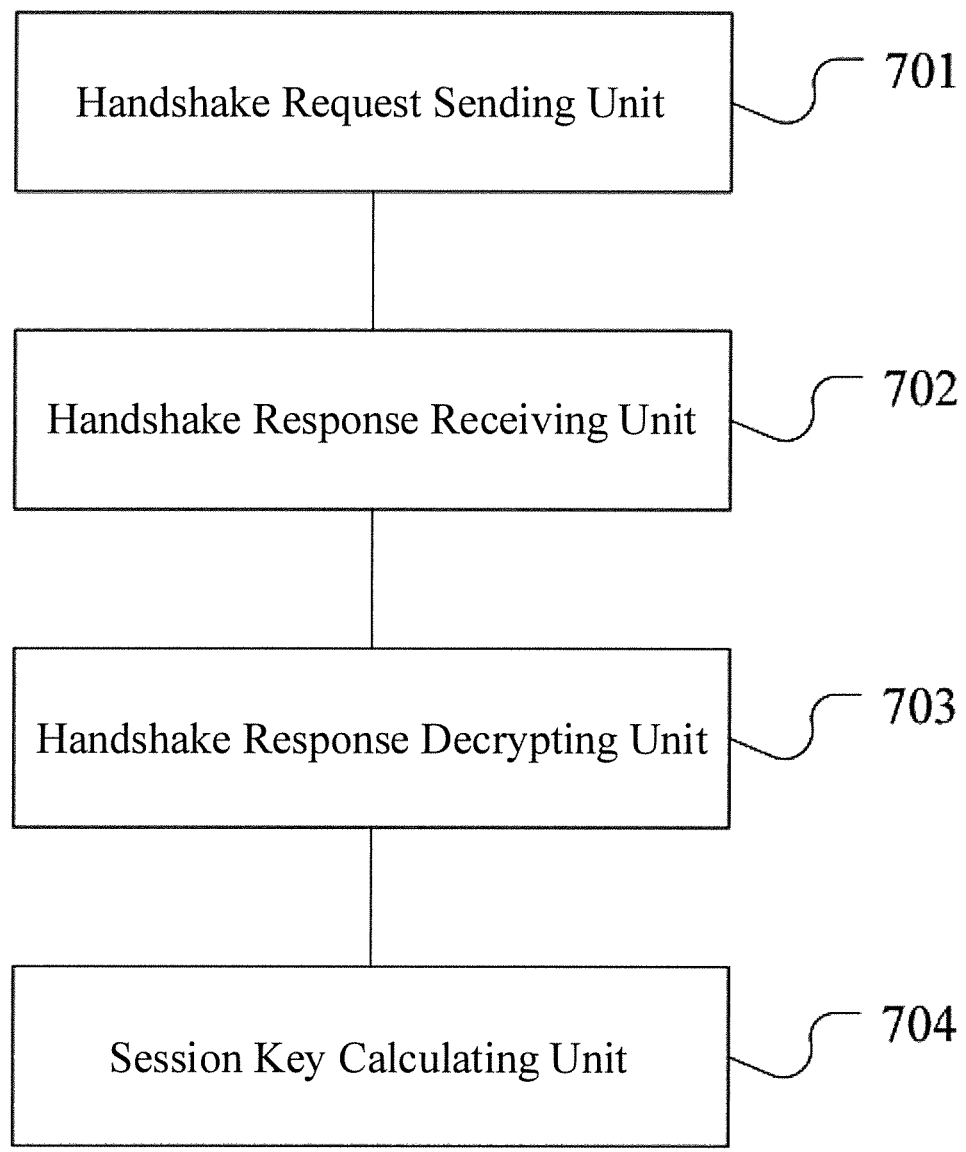
FIG. 7 is a schematic diagram of an exemplary apparatus for secure network communications, according to an embodiment of the present application.

FIG. 7 is a schematic diagram of an exemplary apparatus for secure network communications, according to an embodiment of the present application. As shown in FIG. 7, the apparatus may include a handshake request sending unit 701, a handshake response receiving unit 702, a handshake response decrypting unit 703, and a session key calculating unit 704.

The apparatus may include handshake request sending unit 701 configured to send a handshake request message to a server. The handshake request message contains a first random number encrypted by using a first public key and first service request data encrypted by using the first public key. The server decrypts the handshake request message in accordance with a first private key corresponding to the first public key to obtain the first random number and the first service request data, and generates first service response data in accordance with the first service request data.

The apparatus may also include handshake response receiving unit 702 configured to receive a handshake response message replied from the server. The handshake response message contains the first service response data encrypted by using the first random number and a second random number encrypted by using the first random number.

The apparatus may further include handshake response decrypting unit 703 configured to decrypt the handshake response message by using the first random number to obtain the first service response data and the second random number.

In addition, the apparatus may include session key calculating unit 704 configured to calculate a session key used in a session with the server in accordance with the first random number and the second random number.

In some embodiments, the apparatus for secure network communications may also include a ciphertext service request sending unit and a ciphertext service response receiving unit.

The apparatus may include the ciphertext service request sending unit configured to send a ciphertext service request message to the server. The ciphertext service request message contains an identifier of the session key and second service request data encrypted by using the session key. The server looks up a corresponding session key in accordance with the identifier of the session key, and decrypts the ciphertext service request message by using the corresponding session key to obtain the second service request data.

The apparatus may also include the ciphertext service response receiving unit configured to receive a ciphertext service response message replied from the server. The ciphertext service response message contains second service response data encrypted by using the corresponding session key. The second service response data is generated by the server in accordance with the second service request data.

In some embodiments, the apparatus for secure network communications may further include a plaintext service request sending unit and a plaintext service response receiving unit.

The apparatus may include the plaintext service request sending unit configured to send a plaintext service request message to the server. The plaintext service request message contains third service request data for a plaintext. The server obtains the third service request data for the plaintext from the plaintext service request message.

The apparatus may also include the plaintext service response receiving unit configured to receive a plaintext service response message replied from the server. The plaintext service response message contains third service response data of the plaintext. The third service response data is generated by the server in accordance with the third service request data.

In some embodiments, a client may include the apparatus for secure network communications shown in the FIG. 7.

Figure 8:
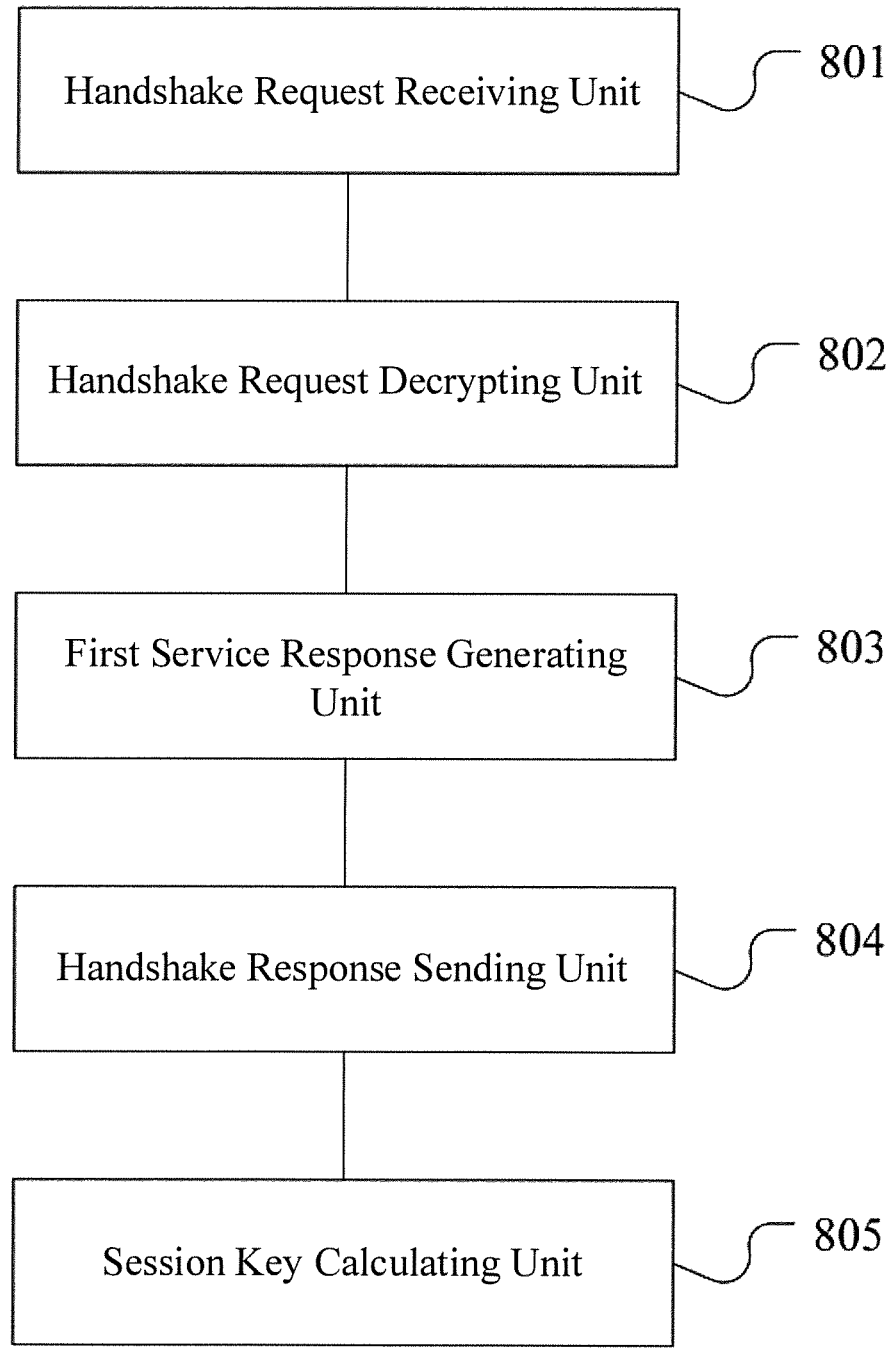
FIG. 8 is a schematic diagram of another exemplary apparatus for secure network communications, according to an embodiment of the present application.

In another aspect, the present disclosure is also directed to an apparatus for secure network communications for a server side. As shown in FIG. 8, the apparatus for secure network communications may include a handshake request receiving unit 801, a handshake request decrypting unit 802, a first service response generating unit 803, a handshake response sending unit 804, and a session key calculating unit 805.

The apparatus may include handshake request receiving unit 801 configured to receive a handshake request message sent by a client. The handshake request message contains a first random number encrypted by using a first public key and first service request data encrypted by using the first public key.

The apparatus may also include handshake request decrypting unit 803 configured to decrypt the handshake request message by using a first private key corresponding to the first public key to obtain the first random number and the first service request data.

The apparatus may further include first service response generating unit 803 configured to generate first service response data in accordance with the first service request data.

In addition, the apparatus may include handshake response sending unit 804 configured to send a handshake response message to the client. The handshake response message contains the first service response data encrypted by using the first random number and a second random number encrypted by using the first random number. The client decrypts the handshake response message by using the first random number to obtain the first service response data and the second random number, and calculates the session key used in the session in accordance with the first random number and the second random number based on a first key algorithm.

Moreover, the apparatus may include session key calculating unit 805 configured to calculate a session key used in a session in accordance with the first random number and the second random number based on a first key algorithm.

In some embodiments, the apparatus for secure network communications at the server side may also include a ciphertext service request receiving unit, a session key searching unit, a service request decrypting unit, a second service response generating unit, and a ciphertext service response sending unit.

The apparatus may include the ciphertext service request receiving unit configured to receive a ciphertext service request message sent by the client. The ciphertext service request message contains an identifier of the session key and second service request data encrypted by using the session key.

The apparatus may also include the session key lookup unit configured to look up a corresponding session key in accordance with the identifier of the session key.

The apparatus may further include the service request decrypting unit configured to decrypt the ciphertext service request message by using the corresponding session key to obtain the second service request data.

In addition, the apparatus may include the second service response generating unit configured to generate second service response data in accordance with the second service request data.

Moreover, the apparatus may include the ciphertext service response sending unit configured to send a ciphertext service response message to the client. The ciphertext service response message contains the second service response data encrypted by using the corresponding session key.

In some embodiments, the apparatus for secure network communications at the server side may further include a plaintext service request receiving unit, a service request data acquiring unit, a third service response generating unit, and a plaintext service response sending unit.

The apparatus may include the plaintext service request receiving unit configured to receive a plaintext service request message sent by the client. The plaintext service request message contains third service request data for a plaintext.

The apparatus may also include the service request data obtaining unit configured to obtain the third service request data for the plaintext from the plaintext service request message.

The apparatus may further include the third service response generating unit configured to generate third service response data of the plaintext in accordance with the third service request data for the plaintext; and In addition, the apparatus may include the plaintext service response sending unit configured to send a plaintext service response message to the client. The plaintext service response message contains the third service response data of the plaintext.

In the 1990s, an improvement on a technology may be obviously distinguished as an improvement on hardware (for example, an improvement on a circuit structure such as a diode, a transistor, and a switch) or an improvement on software (an improvement on a method procedure). However, with the development of technologies, improvements in many method procedures at present may be considered as direct improvements on hardware circuit structures. Almost all designers program the improved method procedures into hardware circuits to obtain corresponding hardware circuit structures. Therefore, it cannot be assumed that an improvement on a method procedure cannot be implemented by using a hardware entity module. For example, a Programmable Logic Device (PLD) (for example, a Field Programmable Gate Array (FPGA)) is such an integrated circuit, and logic functions thereof are determined by a user programming devices. Designers program by themselves to integrate a digital system into a piece of PLD, rather than requesting a chip manufacturer to design and manufacture a dedicated integrated circuit chip. Moreover, at present, the programming is mostly implemented by using logic compiler software, instead of manually manufacturing an integrated circuit chip. The software is similar to a software complier used for developing and writing a program. Its original code before compiling also needs to be written in a specific programming language, which is referred to as a Hardware Description Language (HDL). There is not merely one type but many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL). Very-High-Speed Integrated Circuit Hardware Description Language (VHDL) and Verilog are most commonly used now. A person skilled in the art should know that a hardware circuit for implementing the logic method procedure may be easily obtained only by logically programming the method procedure using the above several hardware description languages and compiling it into an integrated circuit.

A controller may be implemented in any suitable manner. For example, the controller may be in the form of, for example, a microprocessor or a processor and a computer-readable medium storing computer-readable program codes (for example, software or firmware) executable by the (micro)processor, a logic gate, a switch, an Application Specific Integrated Circuit (ASIC), a programmable logic controller, and an embedded micro-controller. Examples of the controller include, but are not limited to, the following micro-controllers: ARC 625D, Atmel AT91SAM, Microchip PIC18F26K20, and Silicone Labs C8051F320. A memory controller may also be implemented as a part of control logic of a memory.

In addition to implementing the controller by using pure computer-readable programs, a person skilled in the art also know that the method steps may be implemented, through logic programming, by a controller carrying out the same function in the form of a logic gate, a switch, an application specific integrated circuit, a programmable logic controller and an embedded microcontroller. Therefore, this type of controller may be considered as a hardware component. The apparatuses included therein and configured to implement various functions may also be considered as structures inside the hardware component. Alternatively, the apparatuses configured to implement various functions may be considered as both software modules for implementing the method and structures inside the hardware component.

The systems, apparatuses, modules, or units illustrated in the above embodiments may be implemented by using a computer, a computing chip, or an apparatus unit having the required function.

The above apparatuses are described as various units in accordance with their respective functions. In some embodiments, the functions of these units may be implemented in the same one or multiple software and/or hardware manner.

Based on the foregoing descriptions of the implementations, a person skilled in the art may clearly understand that the present application may be implemented by software plus necessary universal hardware platform. Based on such an understanding, the technical solutions of the present application itself or the part contributing to the prior art may be implemented in the form of a software product. In a typical configuration, a computer may include one or more processors (CPUs), an input/output interface, a network interface, and a memory. The computer software product may include several instructions for instructing the computer (which may be a personal computer, a server, a network device, or the like) to perform the methods described in the embodiments or some parts of the embodiments of the present application. The computer software product may be stored in a memory. The memory may include a volatile memory, a random access memory (RAM), and/or a non-volatile memory or the like in a computer-readable medium, such as a read only memory (ROM) or a flash RAM. The memory is an example of the computer-readable medium. The computer-readable medium may include non-volatile and volatile media, and removable and non-removable media, and may implement information storage by means of any method or technology. Information may be a computer-readable instruction, a data structure, and a module of a program or other data. A storage medium of a computer may include, but is not limited to, a phase change memory (PRAM), a static random access memory (SRAM), a dynamic random access memory (DRAM), other types of RAMs, a read only memory (ROM), an electrically erasable programmable read-only memory (EEPROM), a flash memory or other memory technologies, a compact disk read only memory (CD-ROM), a digital versatile disc (DVD) or other optical storages, a cassette tape, a magnetic tape/magnetic disk storage or other magnetic storage devices, or any other non-transmission medium. The storage medium of the computer may be used to store information accessible to the computing device. According to the definition herein, the computer-readable medium does not include transitory media, such as a modulated data signal and a carrier.

The above embodiments of the present application are described in an incremental manner. Identical or similar parts of the embodiments may be obtained with reference to each other. The description of each embodiment emphasizes a different feature from the other embodiments. In particular, since the system embodiments are mostly similar to the method embodiments, they are merely described briefly. The descriptions of those similar parts may be referred to the descriptions of the method embodiments.

The embodiments of the present application is applicable to various universal or dedicated computer system environments or configurations, such as a personal computer, a server computer, a handheld device or a portable device, a tablet device, a multi-processor system, a microprocessor-based system, a set top box, a programmable consumer electronic device, a network person computer, a microcomputer, a mainframe computer, and a distributed computing environment including any of the above systems or devices.

The embodiments of the present application may be carried out in a common context of computer-executable instructions executed by a computer, for example, a program module. Generally, the program module may include a routine, a program, an object, an assembly, a data structure, and the like used for executing a specific task or implementing a specific abstract data type. The embodiments of the present application may also be implemented in a distributed computing environment. In the distributed computer environment, a task is executed by using remote processing devices connected through a communications network. In the distributed computer environment, the program module may be located in a local storage apparatus and/or a remote computer storage medium.

Although the present application is described through the above embodiments, a person of ordinary skill in the art should know that the present application includes many variations and changes without departing from the spirit of the present application. The following claims cover those variations and changes without departing from the spirit of the present application.

What is claimed is:

1. A method for secure network communications, the method comprising:
    sending a handshake request message to a server, wherein:
        the handshake request message contains a first random number encrypted by using a first public key and first service request data encrypted by using the first public key,
        the handshake request message is decrypted by the server in accordance with a first private key corresponding to the first public key to obtain the first random number and the first service request data, and
        the first service request data is used by the server to generate first service response data in accordance with the first service request data;
    receiving a handshake response message replied from the server, wherein the handshake response message contains the first service response data encrypted by using the first random number and a second random number encrypted by using the first random number;
    decrypting the handshake response message by using the first random number to obtain the first service response data and the second random number; and
    calculating a session key used in a session with the server in accordance with the first random number and the second random number.

2. The method according to claim 1, further comprising:
    sending a ciphertext service request message to the server, wherein:
        the ciphertext service request message contains an identifier of the session key and second service request data encrypted by using the session key,
        the identifier of the session key is used by the server to look up a corresponding session key, and
        the corresponding session key is used by the server to decrypt the ciphertext service request message for obtaining the second service request data; and
    receiving a ciphertext service response message replied from the server, wherein:
        the ciphertext service response message contains second service response data encrypted by using the corresponding session key, and
        the second service response data is generated by the server in accordance with the second service request data.

3. The method according to claim 2, further comprising:
    sending a plaintext service request message to the server, wherein:
        the plaintext service request message contains third service request data for a plaintext, and
        the third service request data for the plaintext is obtained by the server from the plaintext service request message; and
    receiving a plaintext service response message replied from the server, wherein:
        the plaintext service response message contains third service response data of the plaintext, and
        the third service response data is generated by the server in accordance with the third service request data.

4. The method according to claim 2, further comprising:
    receiving a notification of expiration of the session key replied from the server; and
    sending another handshake request message to the server.

5. A method for secure network communications, the method comprising:
    receiving a handshake request message sent from a client, wherein the handshake request message contains a first random number encrypted by using a first public key and first service request data encrypted by using the first public key;
    decrypting the handshake request message by using a first private key corresponding to the first public key to obtain the first random number and the first service request data;
    generating first service response data in accordance with the first service request data;
    sending a handshake response message to the client, wherein:
        the handshake response message contains the first service response data encrypted by using the first random number and a second random number encrypted by using the first random number,
        the handshake response message is decrypted by the client by using the first random number to obtain the first service response data and the second random number, and
        the first random number and the second random number are used by the client to calculate a session key used in a session based on a first key algorithm; and
    calculating the session key used in the session in accordance with the first random number and the second random number based on the first key algorithm.

6. The method according to claim 5, further comprising:
    receiving a ciphertext service request message sent from the client, wherein the ciphertext service request message contains an identifier of the session key and second service request data encrypted by using the session key;
    looking up a corresponding session key in accordance with the identifier of the session key;
    decrypting the ciphertext service request message by using the corresponding session key to obtain the second service request data;
    generating second service response data in accordance with the second service request data; and sending a ciphertext service response message to the client, wherein the ciphertext service response message contains the second service response data encrypted by using the corresponding session key.

7. The method according to claim 6, further comprising:
receiving a plaintext service request message sent by the client, wherein the plaintext service request message contains third service request data for a plaintext;
obtaining the third service request data from the plaintext service request message;
generating third service response data of the plaintext in accordance with the third service request data; and
sending a plaintext service response message to the client, wherein the plaintext service response message contains the third service response data of the plaintext.

8. The method according to claim 7, further comprising:
receiving a fourth service request message sent from the client;
determining whether the fourth service request message is the ciphertext service request message or the plaintext service request message;
generating a first encryption identifier in accordance with the determination result of whether the fourth service request message is the ciphertext service request message or the plaintext service request message;
establishing a first mapping relationship between an identifier of the fourth service request message and the first encryption identifier of the fourth service request message;
when receiving a fifth service request message sent from the client, looking up a second encryption identifier in accordance with an identifier of the fifth service request message and the first mapping relationship;
triggering execution of sending the ciphertext service response message to the client if the second encryption identifier indicates that the fifth service request message is the ciphertext service request message; and
triggering execution of sending the plaintext service response message to the client if the second encryption identifier indicates that the fifth service request message is the plaintext service request message.

9. An apparatus for secure network communications, the apparatus comprising:
a handshake request sending unit configured to send a handshake request message to a server, wherein:
the handshake request message contains a first random number encrypted by using a first public key and first service request data encrypted by using the first public key,
the handshake request message is decrypted by the server in accordance with a first private key corresponding to the first public key to obtain the first random number and the first service request data, and
the first service request data is used by the server to generate first service response data;
a handshake response receiving unit configured to receive a handshake response message replied from the server, wherein the handshake response message contains the first service response data encrypted by using the first random number and a second random number encrypted by using the first random number;
a handshake response decrypting unit configured to decrypt the handshake response message by using the first random number to obtain the first service response data and the second random number; and a session key calculating unit configured to calculate a session key used in a session with the server in accordance with the first random number and the second random number.

10. The apparatus according to claim 9, further comprising:
a ciphertext service request sending unit configured to send a ciphertext service request message to the server, wherein:
the ciphertext service request message contains an identifier of the session key and second service request data encrypted by using the session key, and
the identifier of the session key is used by the server to look up a corresponding session key, and
the corresponding session key is used by the server to decrypt the ciphertext service request message for obtaining the second service request data; and
a ciphertext service response receiving unit configured to receive a ciphertext service response message replied from the server, wherein:
the ciphertext service response message contains second service response data encrypted by using the corresponding session key, and
the second service response data is generated by the server in accordance with the second service request data.

11. The apparatus according to claim 10, further comprising:
a plaintext service request sending unit configured to send a plaintext service request message to the server, wherein:
the plaintext service request message contains third service request data for a plaintext, and
the third service request data for the plaintext is obtained by the server from the plaintext service request message; and
a plaintext service response receiving unit service response message replied from the server, wherein:
the plaintext service response message contains third service response data of the plaintext, and
the third service response data is generated by the server in accordance with the third service request data.

12. An apparatus for secure network communications, comprising:
a handshake request receiving unit configured to receive a handshake request message sent by a client, wherein the handshake request message contains a first random number encrypted by using a first public key and first service request data encrypted by using the first public key;
a handshake request decrypting unit configured to decrypt the handshake request message by using a first private key corresponding to the first public key to obtain the first random number and the first service request data;
a first service response generating unit configured to generate first service response data in accordance with the first service request data;
a handshake response sending unit configured to send a handshake response message to the client, wherein:
the handshake response message contains the first service response data encrypted by using the first random number and a second random number encrypted by using the first random number, the handshake response message is decrypted by the client by using the first random number to obtain the first service response data and the second random number, and the first random number and the second random number are used by the client to calculate a session key used in a session based on a first key algorithm; and a session key calculating unit configured to calculate a session key used in a session in accordance with the first random number and the second random number based on a first key algorithm.

13. The apparatus according to claim 12, further comprising:

a ciphertext service request receiving unit configured to receive a ciphertext service request message sent by the client, wherein the ciphertext service request message contains an identifier of the session key and second service request data encrypted by using the session key;

a session key lookup unit configured to look up a corresponding session key in accordance with the identifier of the session key;

a service request decrypting unit configured to decrypt the ciphertext service request message by using the corresponding session key to obtain the second service request data;

a second service response generating unit configured to generate second service response data in accordance with the second service request data; and a ciphertext service response sending unit configured to send a ciphertext service response message to the client, wherein the ciphertext service response message contains the second service response data encrypted by using the corresponding session key.

14. The apparatus according to claim 13, further comprising:

a plaintext service request receiving unit configured to receive a plaintext service request message sent by the client, wherein the plaintext service request message contains third service request data for a plaintext;

a service request data obtaining unit configured to obtain the third service request data for the plaintext from the plaintext service request message;

a third service response generating unit configured to generate third service response data of the plaintext in accordance with the third service request data for the plaintext; and a plaintext service response sending unit configured to send a plaintext service response message to the client, wherein the plaintext service response message contains the third service response data of the plaintext.

15. A non-transitory computer readable medium that stores a set of instructions that is executable by at least one processor of an apparatus to cause the apparatus to perform a method for secure network communications, the method comprising:

sending a handshake request message to a server, wherein:

the handshake request message contains a first random number encrypted by using a first public key and first service request data encrypted by using the first public key, the handshake request message is decrypted by the server in accordance with a first private key corresponding to the first public key to obtain the first random number and the first service request data, and the first service request data is used by the server to generate first service response data;

receiving a handshake response message replied from the server, wherein the handshake response message contains the first service response data encrypted by using the first random number and a second random number encrypted by using the first random number;

decrypting the handshake response message by using the first random number to obtain the first service response data and the second random number; and calculating a session key used in a session with the server in accordance with the first random number and the second random number.

16. The non-transitory computer-readable medium of claim 15, wherein the set of instructions that is executable by the at least one processor of the apparatus to cause the apparatus to further perform:

sending a ciphertext service request message to the server, wherein:

the ciphertext service request message contains an identifier of the session key and second service request data encrypted by using the session key, the server the identifier of the session key is used by the server to look up a corresponding session key, and and decrypts the ciphertext service request the corresponding session key is used by the server to decrypt the ciphertext service request message for obtaining the second service request data; and receiving a ciphertext service response message replied from the server, wherein:

the ciphertext service response message contains second service response data encrypted by using the corresponding session key, and the second service response data is generated by the server in accordance with the second service request data.

17. The non-transitory computer-readable medium of claim 16, wherein the set of instructions that is executable by the at least one processor of the apparatus to cause the apparatus to further perform:

sending a plaintext service request message to the server, wherein:

the plaintext service request message contains third service request data for a plaintext, and the third service request data for the plaintext is obtained by the server from the plaintext service request message; and receiving a plaintext service response message replied from the server, wherein:

the plaintext service response message contains third service response data of the plaintext, and the third service response data is generated by the server in accordance with the third service request data.

18. A non-transitory computer readable medium that stores a set of instructions that is executable by at least one processor of an apparatus to cause the apparatus to perform a method for secure network communications, the method comprising:

receiving a handshake request message sent from a client, wherein the handshake request message contains a first random number encrypted by using a first public key and first service request data encrypted by using the first public key;

decrypting the handshake request message by using a first private key corresponding to the first public key to obtain the first random number and the first service request data;

generating first service response data in accordance with the first service request data;

sending a handshake response message to the client, wherein:

the handshake response message contains the first service response data encrypted by using the first random number and a second random number encrypted by using the first random number, the handshake response message is decrypted by the client by using the first random number to obtain the first service response data and the second random number, and the first random number and the second random number are used by the client to calculate a session key used in a session based on a first key algorithm; and calculating the session key used in the session in accordance with the first random number and the second random number based on the first key algorithm.

19. The non-transitory computer-readable medium of claim 18, wherein the set of instructions that is executable by the at least one processor of the apparatus to cause the apparatus to further perform:

receiving a ciphertext service request message sent from the client, wherein the ciphertext service request message contains an identifier of the session key and second service request data encrypted by using the session key;

looking up a corresponding session key in accordance with the identifier of the session key;

decrypting the ciphertext service request message by using the corresponding session key to obtain the second service request data;

generating second service response data in accordance with the second service request data; and sending a ciphertext service response message to the client, wherein the ciphertext service response message contains the second service response data encrypted by using the corresponding session key.

20. The non-transitory computer-readable medium of claim 19, wherein the set of instructions that is executable by the at least one processor of the apparatus to cause the apparatus to further perform:

receiving a plaintext service request message sent by the client, wherein the plaintext service request message contains third service request data for a plaintext;

obtaining the third service request data from the plaintext service request message;

generating third service response data of the plaintext in accordance with the third service request data; and sending a plaintext service response message to the client, wherein the plaintext service response message contains the third service response data of the plaintext.

* * * * *